US008614972B2

(12) United States Patent
Takagi

(10) Patent No.: US 8,614,972 B2
(45) Date of Patent: Dec. 24, 2013

(54) RADIO BASE STATION, RADIO ACCESS NETWORK, COMMUNICATION CONTROLLING CIRCUIT, STORAGE MEDIUM, AND COMMUNICATION CONTROLLING METHOD

(75) Inventor: Kenki Takagi, Tokyo (JP)

(73) Assignee: NEC Corporation, Tokyo (JP)

( * ) Notice: Subject to any disclaimer, the term of this patent is extended or adjusted under 35 U.S.C. 154(b) by 228 days.

(21) Appl. No.: 13/056,049

(22) PCT Filed: Oct. 21, 2009

(86) PCT No.: PCT/JP2009/005519
§ 371 (c)(1),
(2), (4) Date: Jan. 26, 2011

(87) PCT Pub. No.: WO2010/047102
PCT Pub. Date: Apr. 29, 2010

(65) Prior Publication Data
US 2011/0188480 A1     Aug. 4, 2011

(30) Foreign Application Priority Data

Oct. 24, 2008   (JP) ................................ 2008-274053

(51) Int. Cl.
*H04W 4/00*     (2009.01)
*H04B 7/216*    (2006.01)
*H04B 17/00*    (2006.01)
*H04Q 7/20*     (2006.01)

(52) U.S. Cl.
USPC ........ 370/312; 370/328; 370/335; 455/67.11; 455/450; 455/502; 455/507

(58) Field of Classification Search
USPC ......... 370/252, 328, 329, 332, 335, 336, 350; 455/67.11, 403, 446, 450, 507, 502, 455/522, 561
See application file for complete search history.

(56) References Cited

U.S. PATENT DOCUMENTS

| 6,101,176 | A  |   | 8/2000  | Honkasalo et al. |
| 2006/0154686 | A1 | * | 7/2006 | Sarkkinen et al. ............ 455/522 |
| 2008/0075061 | A1 |   | 3/2008 | Hatala et al. |
| 2009/0196174 | A1 | * | 8/2009 | Ji ............................... 370/230.1 |
| 2009/0268693 | A1 | * | 10/2009 | Lindh et al. .................... 370/336 |
| 2009/0285144 | A1 | * | 11/2009 | Motegi et al. ................. 370/312 |

(Continued)

FOREIGN PATENT DOCUMENTS

| GB | 2456783 | * | 1/2008 | ................ H03L 7/00 |
| JP | 2000341743 | A | 12/2000 | |

(Continued)

OTHER PUBLICATIONS

Japanese Office Action for JP2010-534692 issued Apr. 10, 2012.

(Continued)

*Primary Examiner* — Afsar M Qureshi

(57) ABSTRACT

In order to synchronize timings of transmission through a radio channel for broadcast communication even when a plurality of base stations communicate independently of one another, a receiver 11 in a radio base station 10 receives broadcast information INFO1 transmitted from a different radio base station 40 through a radio channel CH1 for transmitting the broadcast information. A controller 12 specifies a radio channel CH2 used for broadcast communication by the different radio base station 40 and adjusts a timing of transmission through the radio channel CH2 for broadcast communication in its own radio base station 10 to be synchronized with a timing of transmission in the different radio base station 40, based on the broadcast information INFO1. A transmitter 13 transmits data through the radio channel CH2 for broadcast communication in accordance with the adjusted timing TA of transmission.

15 Claims, 9 Drawing Sheets

(56) References Cited

U.S. PATENT DOCUMENTS

| | | | |
|---|---|---|---|
| 2010/0015987 A1* | 1/2010 | Katori et al. | 455/450 |
| 2010/0054237 A1* | 3/2010 | Han et al. | 370/350 |
| 2010/0080192 A1* | 4/2010 | Dong et al. | 370/332 |
| 2010/0165901 A1* | 7/2010 | Kim | 370/312 |
| 2011/0077035 A1* | 3/2011 | Charipadi et al. | 455/507 |

FOREIGN PATENT DOCUMENTS

| | | |
|---|---|---|
| JP | 2005500767 A | 1/2005 |
| JP | 2008182386 A | 8/2008 |

OTHER PUBLICATIONS

International Search Report for PCT/JP2009/005519 mailed Jan. 26, 2009.

3GPP TR R3.020 V0.8.0, Technical Specification Group Radio Access Network; Home (e)NodeB; Network aspects (Release 8), Jun. 2008.

Chinese Office Action for CN Application No. 200980142483.6 issued on Jun. 3, 2013 with English Translation.

\* cited by examiner

RADIO BASE STATION, RADIO ACCESS NETWORK, COMMUNICATION CONTROLLING CIRCUIT, STORAGE MEDIUM, AND COMMUNICATION CONTROLLING METHOD

This application is the National Phase of PCT/JP2009/005519, filed Oct. 21, 2009 which is based upon and claims the benefit of priority from Japanese patent application No. 2008-274053, filed on Oct. 24, 2008, the disclosure of which is incorporated herein in its entirety by reference.

TECHNICAL FIELD

The present invention relates to a radio base station, a radio access network, a communication controlling circuit, a storage medium which stores a communication controlling program, and a communication controlling method, and particularly to a technology which synchronizes timings of transmission through a radio channel for broadcast communication between radio base stations.

BACKGROUND ART

Recently, there have been started operations of an MBMS (Multimedia Broadcast and Multicast Service) which simultaneously distributes multimedia data such as broadcast data to a plurality of user terminals. The specifications of the MBMS are established on the premise of use in a radio access network adopting a WCDMA (Wideband Code Division Multiple Access) method. Specifically, a plurality of radio base stations forming the radio access network transmit the same multimedia data thorough an SCCPCH (Secondary Common Control Physical Channel).

On the other hand, each of the user terminals obtains a combined gain of radio signals respectively received from adjacent radio base stations through the SCCPCH to improve reception quality of the multimedia data. In order to obtain the combined gain, timings of transmission through the SCCPCH need to be synchronized within a predetermined time difference between the adjacent radio base stations.

Therefore, in the radio access network, a radio base station controlling device (RNC: Radio Network Controller) adjusts (controls) the timings of transmission through the SCCPCH between the adjacent radio base stations.

Note that Patent Literature 1 discloses a method where a plurality of radio base stations are connected through an exclusive cable, and data for synchronization is transmitted and received through the exclusive cable, thereby synchronizing transmission timings of data between the radio base stations.

CITATION LIST

Patent Literature

[Patent Literature 1]
Japanese Unexamined Patent Application Publication No. 2000-341743

SUMMARY OF INVENTION

Technical Problem

Recently, there has been advanced development of radio base stations which can be placed indoors. A cell formed by such a radio base station is generally called a femto cell since its cover area is enormously narrow compared with a radio base station placed outdoors. In the subsequent description, the radio base station forming the femto cell is referred to as "femto base station". By contrast, a radio base station forming a cell (generally called a macro cell) on a broader scale than the femto cell is referred to as "macro base station".

Further, the femto base station has the function equivalent to the RNC and is connected to a core network or a server directly, or to a gateway terminating the femto base station. Accordingly, communication is performed independently of one another between adjacent femto base stations. Therefore, the femto base station has difficulty in synchronizing the timing of transmission through the SCCPCH, in contrast to the general macro base station. Furthermore, there is a macro base station into which the function equivalent to the RNC is built. Such a macro base station also has difficulty in synchronizing the timing of transmission through the SCCPCH with those in other macro base stations. Note that while the above problem is described using the cases of the femto base station and the macro base station, the same problem also occurs in a general base station or a communication device equivalent to the base station.

Accordingly, the present invention aims to provide a radio base station, a radio access network, a communication controlling circuit, a storage medium that stores a communication controlling program, and a communication controlling method, which can synchronize timings of transmission through a radio channel for broadcast communication, even when a plurality of base stations communicate independently of one another.

Solution to Problem

In order to achieve the above-mentioned aim, a radio base station according to a first exemplary aspect of the invention includes a receiver that receives broadcast information transmitted from a different radio base station through a first radio channel, a controller that specifies a second radio channel used for broadcast communication by the different radio base station and adjusts a timing of transmission through the second radio channel in its own radio base station to be synchronized with a timing of transmission in the different radio base station, based on the broadcast information, and a transmitter that transmits data through the second radio channel in accordance with the adjusted timing of transmission.

Further, a radio access network according to a second exemplary aspect of the invention includes a plurality of radio base stations and a monitoring device capable of communicating with the radio base stations. The monitoring device classifies the radio base stations as a master radio base station to determine a timing of transmission through a radio channel for broadcast communication and a slave radio base station to synchronize a timing of transmission through the radio channel with the timing of transmission in the master radio base station based on specifying information received from each radio base station to specify a reachable range of a radio signal from each radio base station, and notifies a result of the classification to each radio base station. The slave radio base station specifies the radio channel for the broadcast communication based on broadcast information received from the master radio base station through a radio channel different from the radio channel for the broadcast communication, adjusts a timing of transmission through the radio channel for the broadcast communication to be synchronized with the timing of transmission in the master radio base station, and transmits data through the radio channel for the broadcast communication in accordance with the adjusted timing of transmission.

Further, a communication controlling circuit according to a third exemplary aspect of the invention makes a radio base station perform broadcast communication. This communication controlling circuit includes a receiver that receives broadcast information transmitted from a different radio base station through a first radio channel, a controller that specifies a second radio channel used for the broadcast communication by the different radio base station and adjusts a timing of transmission through the second radio channel in the radio base station to be synchronized with a timing of transmission in the different radio base station, based on the broadcast information, and a transmitter that transmits data through the second radio channel in accordance with the adjusted timing of transmission.

Further, a storage medium according to a fourth exemplary aspect of the invention stores a communication controlling program for causing a radio base station to execute a process to receive broadcast information transmitted from a different radio base station through a first radio channel, a process to specify a second radio channel used for broadcast communication by the different radio base station and to adjust a transmission of transmission through the second radio channel in the radio base station to be synchronized with a timing of transmission in the different radio base station, based on the broadcast information, and a process to transmit data through the second radio channel in accordance with the adjusted transmission of transmission.

Furthermore, a communication controlling method according to a fifth exemplary aspect of the invention provides a method of controlling communication in a radio base station. This method includes receiving broadcast information transmitted from a different radio base station through a first radio channel, specifying a second radio channel used for broadcast communication by the different radio base station and adjusting a timing of transmission through the second radio channel in the radio base station to be synchronized with a timing of transmission in the different radio base station, based on the broadcast information, and transmitting data through the second radio channel in accordance with the adjusted timing of transmission.

Advantageous Effects of Invention

According to the present invention, even when a plurality of base stations communicate independently of one another, it is possible to automatically synchronize timings of transmission through a radio channel for broadcast communication between the base stations.

DESCRIPTION OF EMBODIMENTS

Hereafter, first and second exemplary embodiments of a radio base station according to the present invention and a radio access network to which the radio base station is applied will be described with reference to FIGS. 1 to 9. Note that the same signs are assigned to the same elements throughout the drawings, and their duplicated explanation is omitted as appropriate for clarifying the description.

[Configuration Example Common to Each Exemplary Embodiment]

Figure 1:
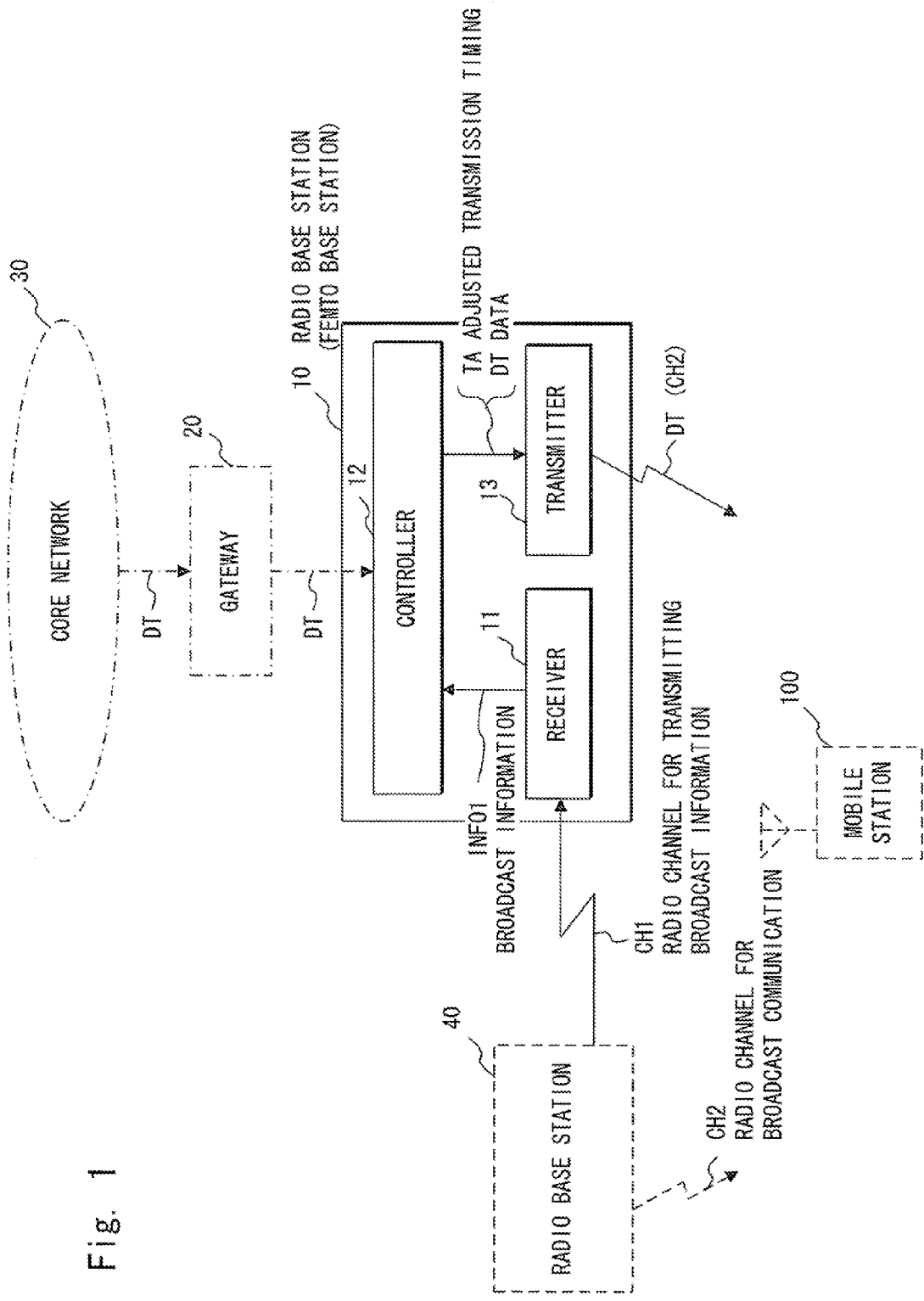
FIG. 1 is a block diagram showing a configuration example of a radio base station common to first and second exemplary embodiments of the present invention.

FIG. 1 shows a configuration example of a radio base station common to first and second exemplary embodiments. In FIG. 1, a radio base station 10 is connected to a core network 30 through a gateway 20 as shown by dashed-dotted lines, so that a case where the radio base station 10 operates as a femto base station can be dealt with. Meanwhile, the subsequent description can be similarly applied even when the radio base station 10 operates as a macro base station into which the RNC function is built.

Further, the radio base station 10 includes a receiver 11, a controller 12 and a transmitter 13. The receiver 12 receives broadcast information INFO1 transmitted from a different radio base station 40 shown by dotted lines in FIG. 1 through a radio channel CH1 for transmitting the broadcast information, and outputs the broadcast information INFO1 to the controller 12. The controller 12 specifies a radio channel CH2 (hereinafter, referred to as "radio channel for broadcast communication") used for broadcast communication by the radio base station 40, and adjusts (aligns) a timing of transmission through the radio channel CH2 for broadcast communication in the radio base station 10 so as to be synchronized with that in the radio base station 40, based on the broadcast information INFO1 input (details on this process will be described later). The transmitter 13 transmits data DT through the radio channel CH2 for broadcast communication in accordance with the timing of transmission TA (hereinafter, referred to as "adjusted transmission timing") adjusted by the controller 12. A mobile station 100 receives the data DT through the channel CH2. The data DT is broadcast data received from the core network 30 through the gateway 20. Note that the radio base station 10 may be placed within a range where the broadcast information INFO1 transmitted from the radio base station 40 can reach. Accordingly, the radio base station 40 may be either the femto base station or the macro base station.

Thus, the radio base station 10 can synchronize the timing of transmission through the radio channel CH2 for broadcast communication with that in the radio base station 40, even when the radio base stations 10 and 40 communicate independently of one another. Note that in the subsequent description, a radio base station which independently determines a timing of transmission through the radio channel CH2 for broadcast communication like the radio base station 40 may be also referred to as "master radio base station". By contrast, like the radio base station 10, a radio base station which synchronizes a timing of transmission through the radio channel CH2 for broadcast communication with that in the master radio base station may be also referred to as "slave radio base station".

[First Exemplary Embodiment]

Figure 2:
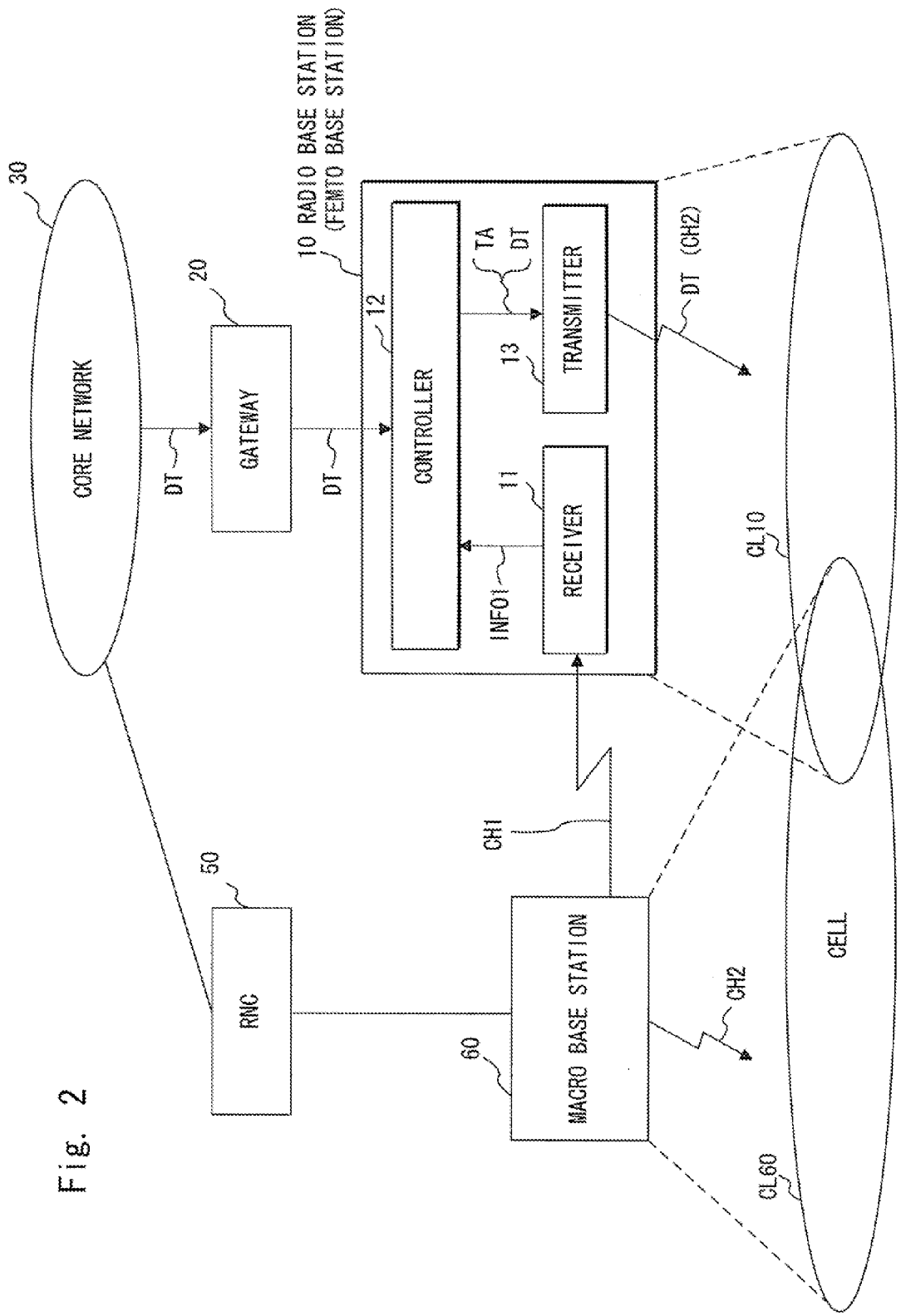
FIG. 2 is a block diagram showing a configuration example of a radio access network according to the first exemplary embodiment of the present invention.

FIG. 2 shows a configuration example of a radio access network in a case where the radio base station 10 is placed around a macro base station 60 controlled by an RNC 50. In this case, the radio base station 10 operates as the slave radio base station while using the macro base station 60 as the master radio base station.

Specifically, the radio base station 10 firstly searches an adjacent cell upon activation of the radio base station 10. As a result, when a cell CL60 formed by the macro base station 60 is detected, the radio base station 10 determines that the radio base station 10 itself is the slave radio base station. The radio base station 10 can easily determine whether or not the cell CL60 is formed by the macro base station 60, by assignment of number systems mutually different between IDs (Identifiers) of cells formed by femto base stations (including the macro base station into which the RNC function is built) and IDs of cells formed by macro base stations (for example, a number equal to or more than 10000 is assigned to the cell ID of the femto base station, and a number equal to or less than 9999 is assigned to the cell ID of the macro base station). Note that the cell ID can be obtained from the above-mentioned broadcast information INFO1.

[Second Exemplary Embodiment]

Figure 3:
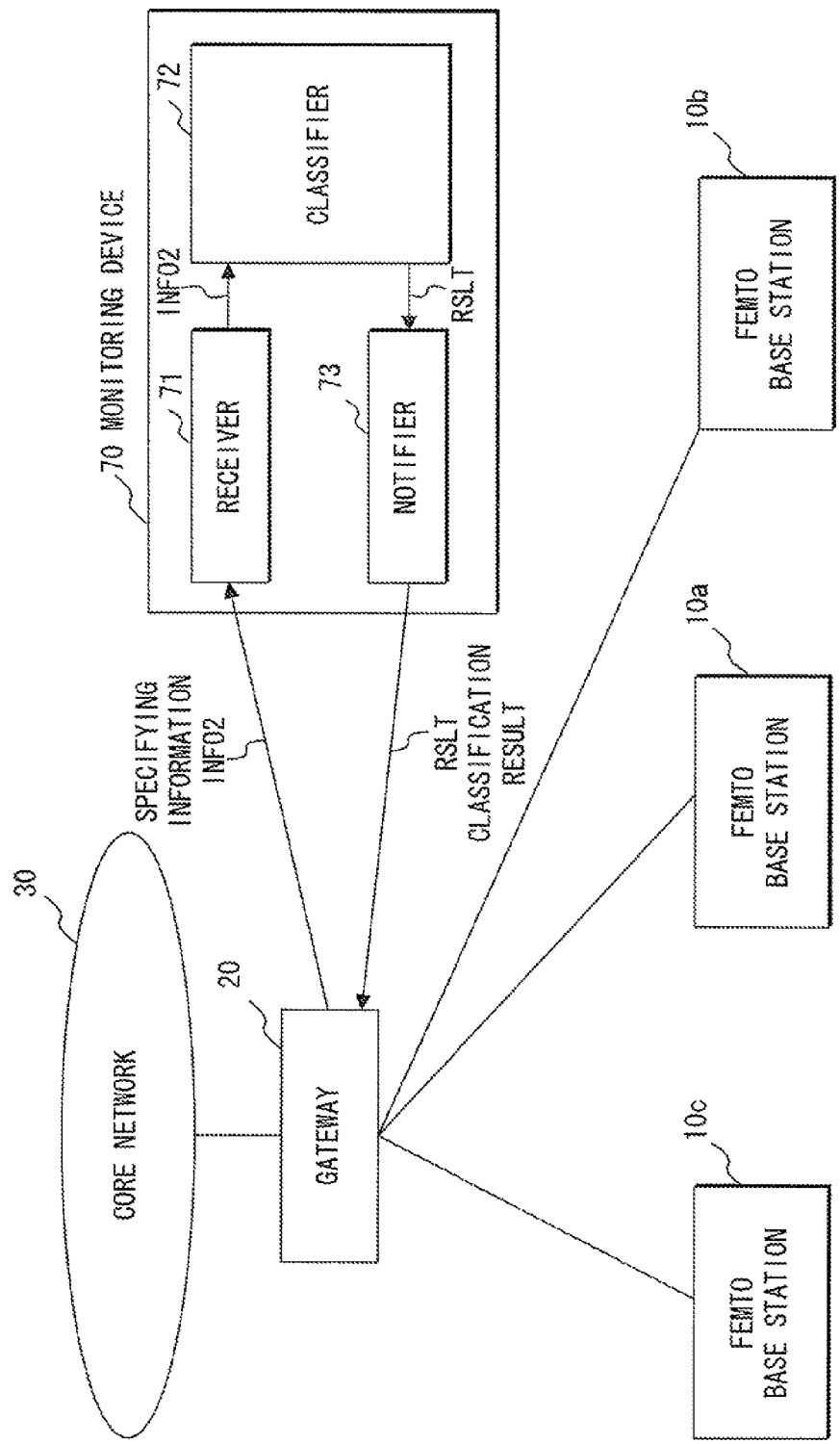
FIG. 3 is a block diagram showing a configuration example of a radio access network according to the second exemplary embodiment of the present invention.

FIG. 3 shows a configuration example of a radio access network in a case where femto base stations 10a-10c similar to the radio base station 10 shown in FIG. 1 are placed adjacent to each other, and a monitoring device 70 is connected to the gateway 20.

The monitoring device 70 includes a receiver 71, a classifier 72 and a notifier 73. The receiver 71 receives specifying information INFO2 from each of the femto base stations 10a-10c. The specifying information INFO2 is the one for specifying a reachable range of a radio signal from each of the femto base stations 10a-10c. The classifier 72 classifies the femto base stations 10a-10c as either the master radio base station or the slave radio base station based on the specifying information INFO2. The notifier 73 notifies a classification result RSLT by the classifier 72 to each of the femto base stations 10a-10c.

Hereafter, operation examples (1) and (2) of this exemplary embodiment will be described in detail with reference to FIGS. 4 to 7.

Operation Example (1)

Figure 4:
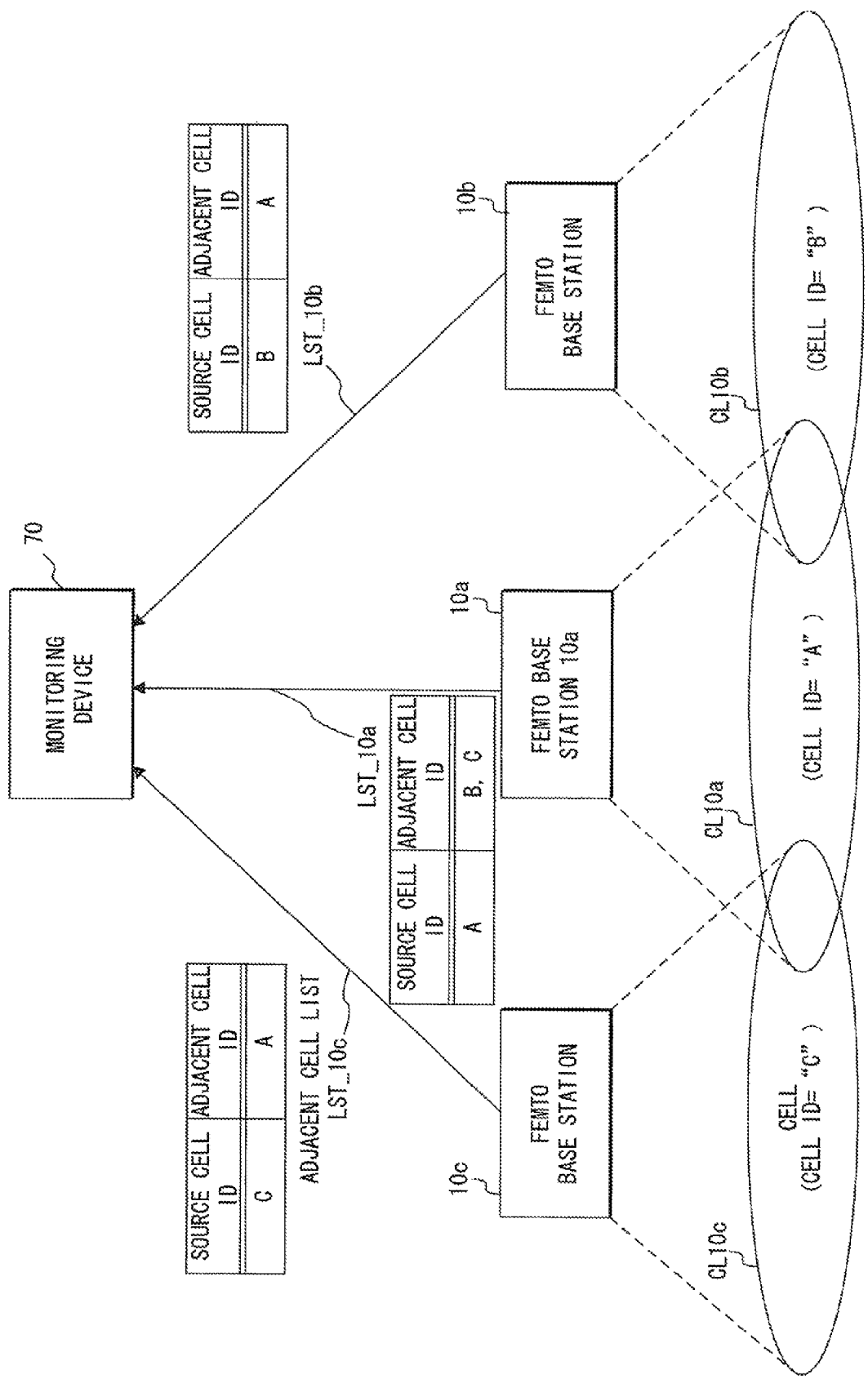
FIG. 4 is a block diagram showing one operation example of the radio base station according to the second exemplary embodiment of the present invention.

As shown in FIG. 4, adjacent cell lists LST_10a-LST_10c (hereinafter, sometimes collectively referred as to the sign LST) are used as the above-mentioned specifying information INFO2 in this operation example. Specifically, each of the femto base stations 10a-10c firstly searches an adjacent cell upon activation thereof. As a result, a cell CL10b formed by the femto base station 10b and a cell CL10c formed by the femto base station 10c are detected as cells adjacent to a cell CL10a formed by the femto base station 10a. At this time, the femto base station 10a notifies the monitoring device 70 of the adjacent cell list LST_10a where a cell ID="A" of the cell CL10a is set as a source cell ID, and adjacent cell IDs="B (cell ID of the cell CL10b)" and "C (cell ID of the cell CL10c)" are set in association with the source cell ID. Similarly, the femto base station 10b notifies the monitoring device 70 of the adjacent cell list LST_10b where a source cell ID="B" and an adjacent cell ID="A" are set. Further, the femto base station 10c notifies the monitoring device 70 of the adjacent cell list LST_10c where a source cell ID="C" and an adjacent cell ID="A" are set. Note that each of the femto base stations 10a-10c may perform the search of the adjacent cell and the notification of the adjacent cell list at certain time intervals after the activation.

Figure 5:
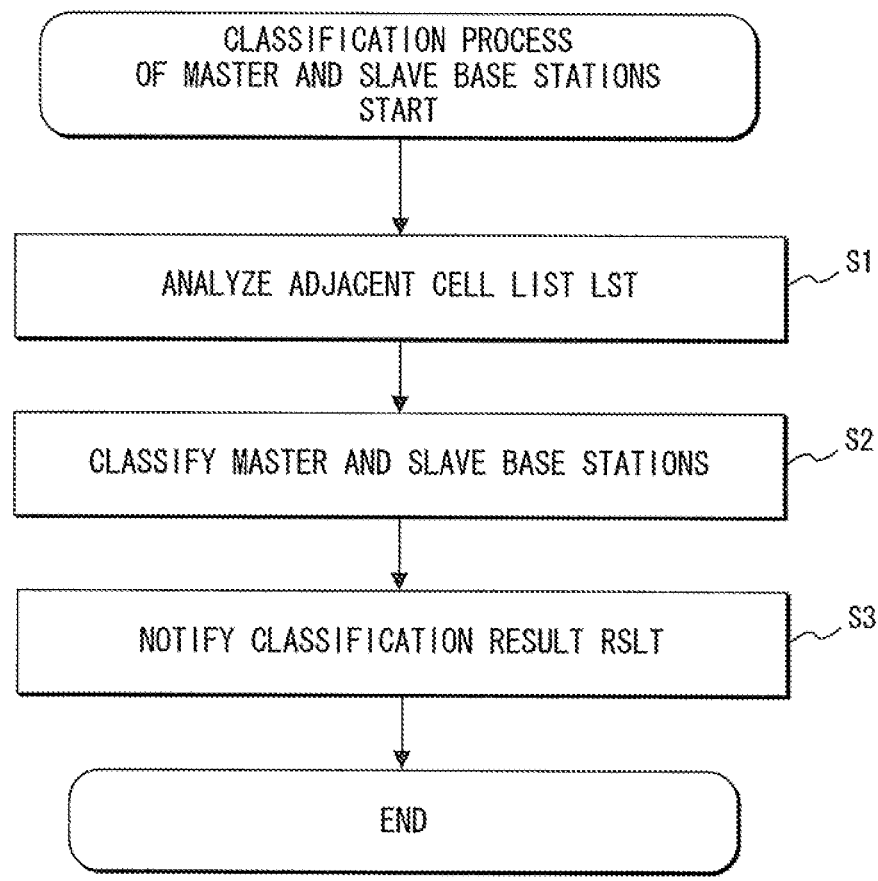
FIG. 5 is a flowchart showing one operation example of a monitoring device according to the second exemplary embodiment of the present invention.

As shown in FIG. 5, the classifier 72 in the monitoring device 70 analyzes the adjacent cell lists LST_10a-LST_10c received through the receiver 71 (Step S1). As a result, the classifier 72 recognizes that the cell CL10a is adjacent to the cells CL 10b and CL10c, but the cells CL10b and CL10c are not adjacent to each other. Namely, the classifier 72 recognizes that the radio signal from the femto base station 10a can reach the femto base stations 10b and 10c, but the radio signal can not be transmitted and received between the femto base stations 10b and 10c.

Accordingly, the classifier 72 classifies the femto base station 10a as the master radio base station, and classifies each of the femto base stations 10b and 10c as the slave radio base station (Step S2). Then, the classifier 72 notifies this classification result RSLT respectively to the femto base stations 10a-10c through the notifier 73 (Step S3).

Therefore, the broadcast information INFO1 transmitted from the femto base station 10a operating as the master radio base station is reliably received at each of the femto base stations 10b and 10c operating as the slave radio base station, so that the timings of transmission through the radio channel CH2 for broadcast communication can be synchronized between the femto base stations 10a-10c.

Operation Example (2)

Figure 6:
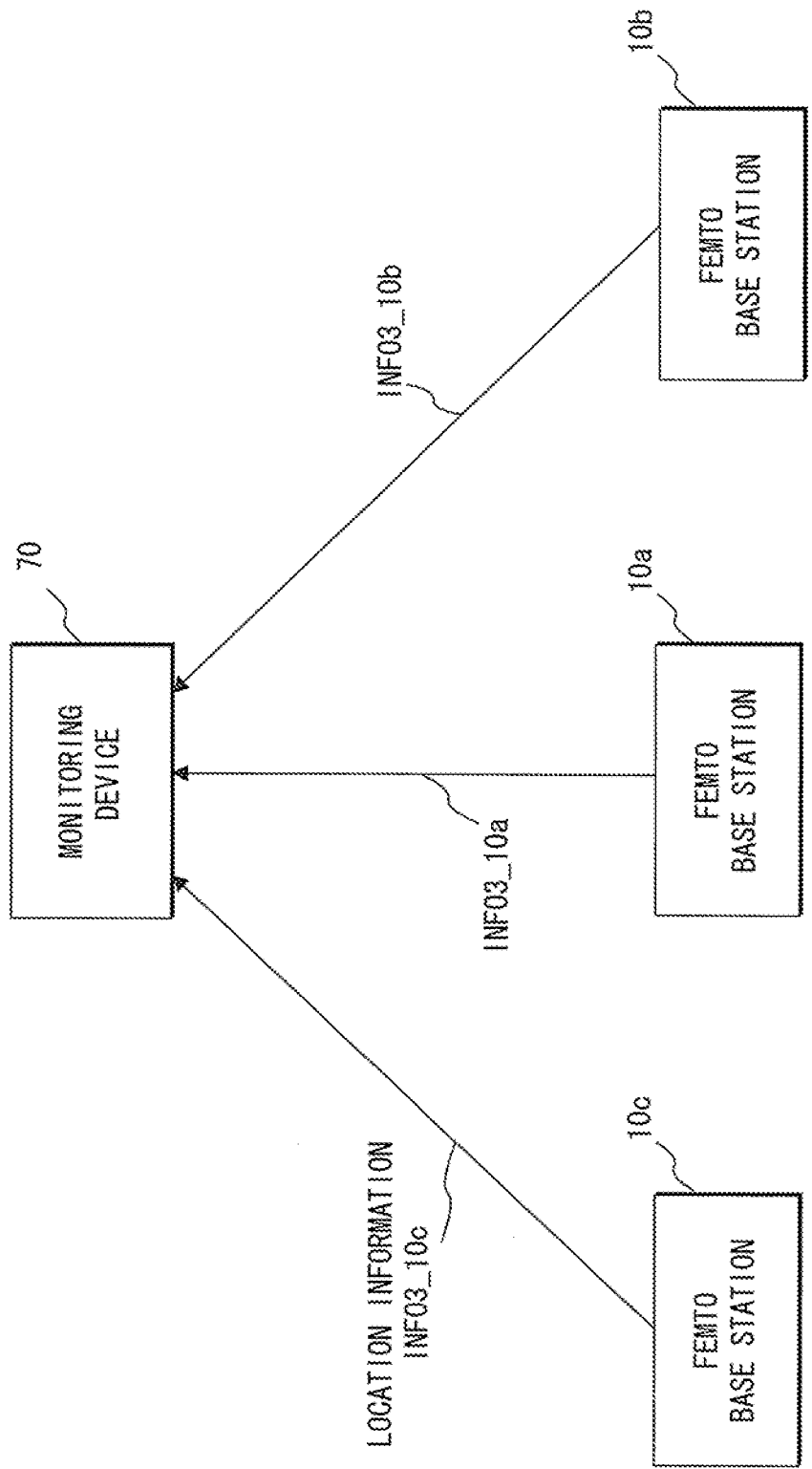
FIG. 6 is a block diagram showing another operation example of the radio base station according to the second exemplary embodiment of the present invention.

As shown in FIG. 6, each of location information INFO3_10a-INFO3_10c (hereinafter, sometimes collectively referred as to the sign INFO3) of the femto base stations 10a-10c is used as the above-mentioned specifying information INFO2 in this operation example. Specifically, each of the femto base stations 10a-10c firstly obtains each of the location information INFO3_10a-INFO3_10c upon the activation, for example by using a GPS (Global Positioning System) receiver. Then, the femto base stations 10a-10c respectively notify the obtained location information INFO3_10a-INFO3_10c to the monitoring device 70. Note that each of the femto base stations 10a-10c may perform the acquisition and the notification of the location information at certain time intervals after the activation. Further, each of the femto base stations 10a-10c may obtain the location information by using not only the GPS receiver but also various types of electric navigation.

Figure 7:
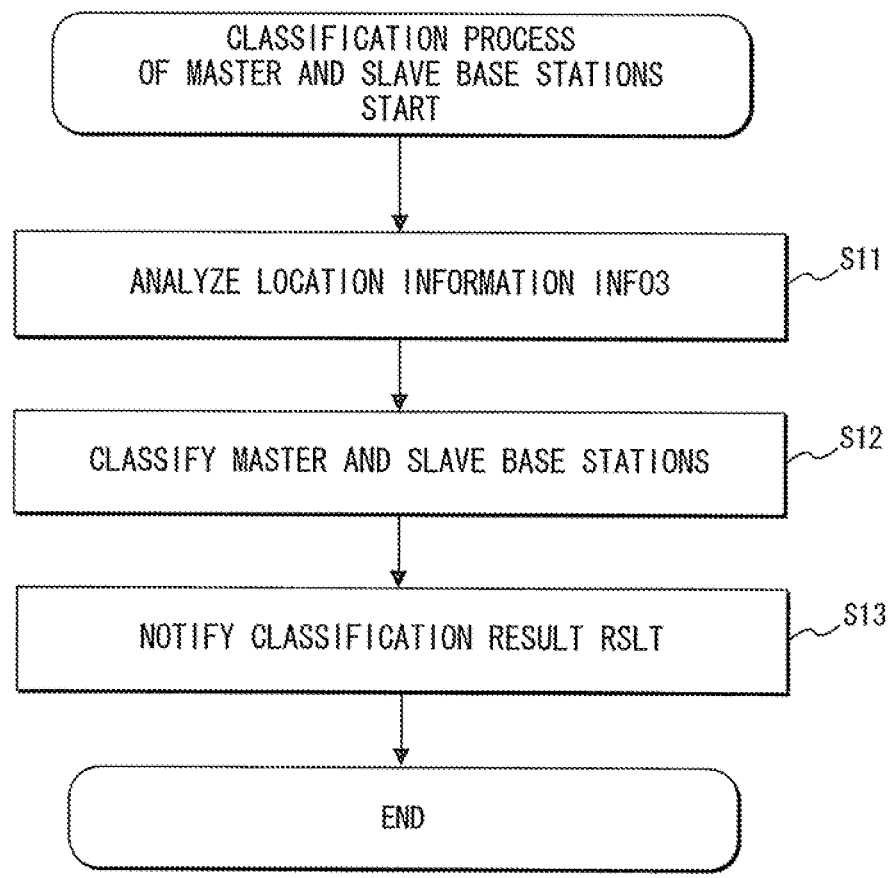
FIG. 7 is a flowchart showing another operation example of the monitoring device according to the second exemplary embodiment of the present invention.

As shown in FIG. 7, the classifier 72 in the monitoring device 70 analyzes the location information INFO3_10a-INFO3_10c received through the receiver 71 (Step S11). As a result, the classifier 72 recognizes that the cell CL10a is adjacent to the cells CL10b and CL10c, but the cells CL10b and CL10c are not adjacent to each other. Namely, the classifier 72 recognizes that the femto base station 10a is adjacent to the femto base stations 10b and 10c, but the femto base stations 10b and 10c are not adjacent to each other (i.e., the radio signal from the femto base station 10a can reach the femto base stations 10b and 10c, but the radio signal can not be transmitted and received between the femto base stations 10b and 10c).

Accordingly, the classifier 72 classifies the femto base station 10a as the master radio base station, and classifies each of the femto base stations 10b and 10c as the slave radio base station (Step S12). Then, the classifier 72 notifies this classification result RSLT respectively to the femto base stations 10a-10c through the notifier 73 (Step S13).

Therefore, as with the above-mentioned operation example (1), the timings of transmission through the radio channel CH2 for broadcast communication can be synchronized between the femto base stations 10a-10c.

Further, in this exemplary embodiment, the monitoring device 70 performs the classification of the master radio base station and the slave radio base station. Therefore, internal circuits of the femto base stations 10a-10c have the same configuration, so that there are also advantages of reducing the cost of development, implementation and the like. Furthermore, when the specifying information INFO2 is periodically notified from each of the femto base stations 10a-10c to the monitoring device 70, the master radio base station and the slave radio base station can be dynamically changed depending on placement conditions of the femto base stations 10a-10c.

Figure 8:
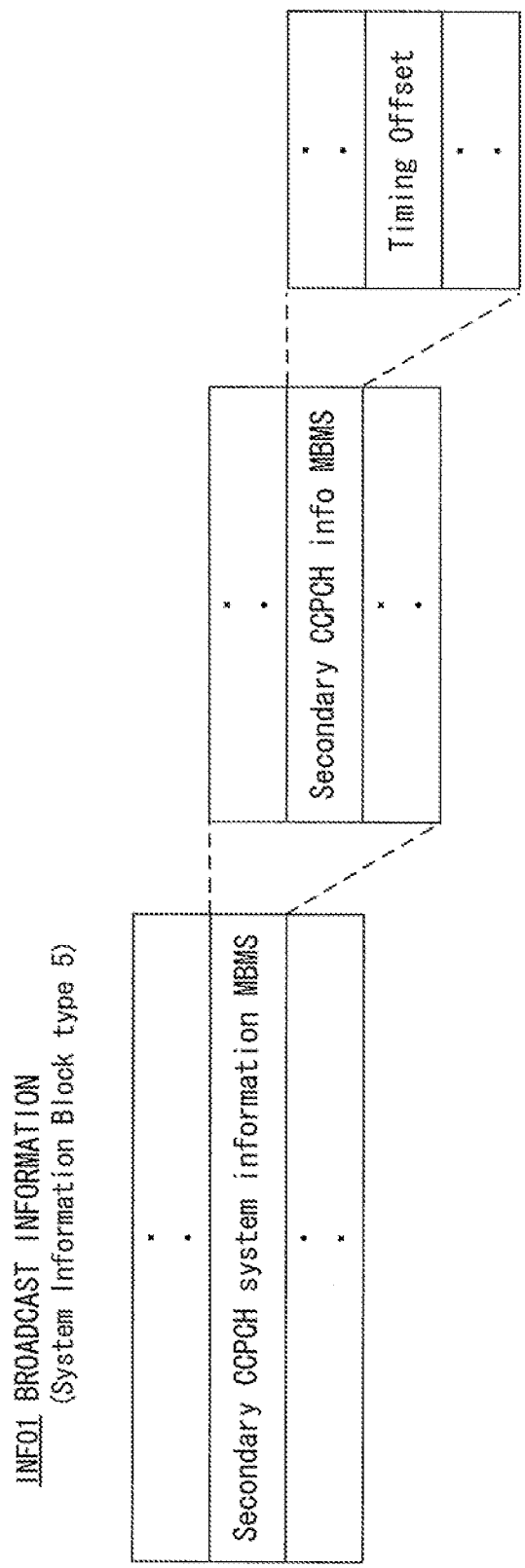
FIG. 8 is a diagram showing a configuration example of broadcast information commonly used in the first and second exemplary embodiments of the present invention.

Finally, examples (1) to (3) of deriving the adjusted transmission timing TA by the radio base station 10 (the slave radio base station) shown in FIG. 1 are described in detail with reference to FIGS. 8 and 9.

Example (1) of Deriving

When the radio base station 10 is applied to a radio access network adopting the WCDMA method, a PCCPCH (Primary Common Control Physical Channel) and the SCCPCH can be used as the radio channel CH1 for transmitting the broadcast information and the radio channel CH2 for broadcast communication respectively. In this case, the broadcast information INFO1 received through the PCCPCH (more specifically, System Information Block type 5) includes an information element "Timing Offset" as shown in FIG. 8.

Figure 9:
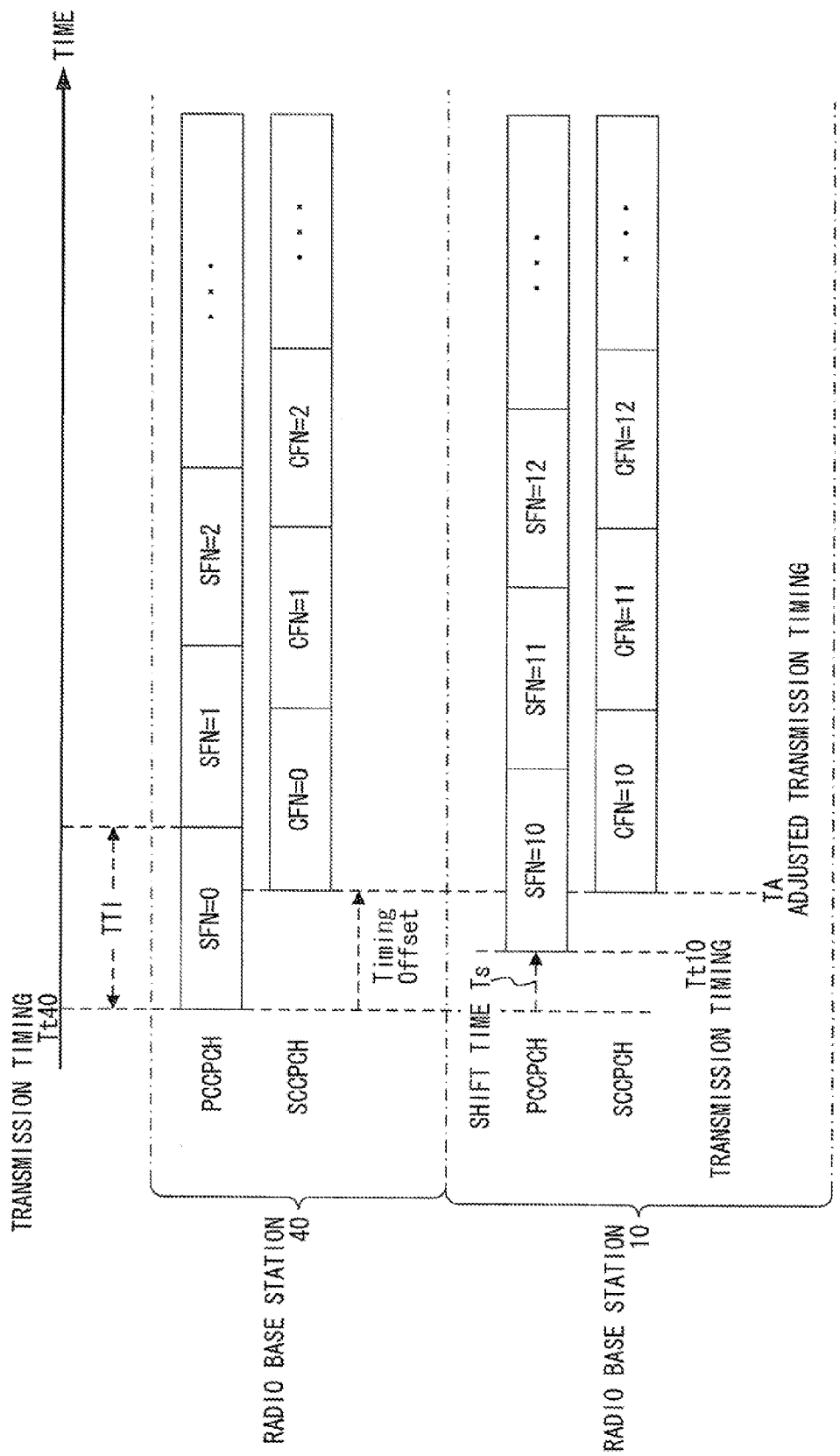
FIG. 9 is a time chart showing one example of deriving an adjusted transmission timing in the radio base station common to the first and second exemplary embodiments of the present invention.

As shown in FIG. 9, the information element "Timing Offset" indicates a delay time of a transmission timing through the SCCPCH with respect to a transmission timing Tt40 through the PCCPCH in the transmission source of the broadcast information INFO1 (i.e., the radio base station 40 shown in FIG. 1). Further, the radio base station 40 sequentially transmits frames through the PCCPCH at predetermined TTIs (Time Transmission Intervals) on the basis of the transmission timing Tt40 (SFNs (System Frame Numbers)=0, 1, 2, . . . are sequentially assigned to these frames). Further, the radio base station 40 sequentially transmits frames through the SCCPCH at the TTIs on the basis of a timing delayed from the transmission timing Tt40 by "Timing Offset" (CFNs (Connection Frame Numbers)=0, 1, 2, . . . are sequentially assigned to these frames).

On the other hand, the controller 12 in the radio base station 10, which has received "Timing Offset", firstly detects a shift time Ts between the transmission timing Tt40 and a transmission timing Tt10 through the PCCPCH in the radio base station 10 itself. Then, the controller 12 determines the adjusted transmission timing TA by using the shift time Ts and "Timing Offset". In the example shown in FIG. 9, the controller 12 determines the adjusted timing TA as "Tt10+ Timing Offset−Ts". After that, the radio base station 10 sequentially transmits frames through the SCCPCH at the TTIs on the basis of the adjusted timing TA.

Thus, the timing of transmission through the SCCPCH in the radio base station 40 and that in the radio base station 10 are synchronized.

Example (2) of Deriving

In this example of deriving, the adjusted transmission timing TA is determined by monitoring the frame transmitted from the radio base station 40 through the SCCPCH, although in the above-mentioned example (1) of deriving, the adjusted transmission timing TA is determined by using the shift time Ts and "Timing Offset".

Specifically, the receiver 11 in the radio base station 10 actually receives the frame from the radio base station 40 through the SCCPCH as with a user terminal (not shown). The controller 12 synchronizes the adjusted transmission timing TA with a reception timing of the frame.

Thus, as with the above-mentioned example (1) of deriving, the timing of transmission through the SCCPCH in the radio base station 40 and that in the radio base station 10 are synchronized.

Further, the controller 12 may make the transmitter 13 transmit through the SCCPCH the frame received from the radio base station 40 without any modification. In this case, the core network 30 and the gateway 20 do not need to provide the data DT to the radio base station 10 (in other words, the data DT may be provided only to the radio base station 40). Therefore, it is possible to reduce the amount of resources consumed in the backbone.

Example (3) of Deriving

In the above-mentioned examples (1) and (2) of deriving, the case where the radio base station 10 is applied to the radio access network adopting the WCDMA method is dealt with. Meanwhile, the radio base station 10 can be also applied to a radio access network adopting other communication methods.

In e.g. an LTE (Long Time Evolution) standard, an OFDMA (Orthogonal Frequency Division Multiple Access) method is adopted for communication in a downlink direction (from radio base station to user terminal). When the radio base station 10 is applied to a radio access network adopting the OFDMA method, a PBCH (Physical Broadcast Channel) and a PMCH (Physical Multicast Channel) can be used as the radio channel CH1 for transmitting the broadcast information and the radio channel CH2 for broadcast communication respectively. In this case, the broadcast information INFO1 received through the PBCH (more specifically, System Information Block type 3) includes an information element "neighbourCellConfigration" (not shown).

The information element "neighbourCellConfigration" indicates allocation information of a radio resource (Sub frame number or the like) concerning the PMCH in the radio base station 40. The controller 12 in the radio base station 10 allocates a radio resource concerning the PMCH in the radio base station 10 itself, in accordance with the allocation information.

Thus, a timing of transmission through the PMCH in the radio base station 40 and that in the radio base station 10 are synchronized.

Note that the present invention is not limited to the above-mentioned exemplary embodiments, and it is obvious that various modifications can be made by those of ordinary skill in the art based on the recitation of the claims.

For example, it is also possible to provide a program for causing a computer to execute each process in the radio base station described in the above-mentioned exemplary embodiments. Further, while the MBMS is dealt with as one example of the broadcast communication, the radio base station according to the present invention can be also applied to other broadcast communication such as a CBS (Cell Broadcast Service) and a Media FLO (Forward Link Only) (registered trademark).

INDUSTRIAL APPLICABILITY

The present invention is applicable to a radio base station, a radio access network, a communication controlling circuit, a storage medium that stores a communication controlling program, and a communication controlling method, and particularly to a technology which synchronizes timings of transmission through a radio channel for broadcast communication between radio base stations.

REFERENCE SIGNS LIST 10, 10a-10c, 40 RADIO BASE STATION
11, 71 RECEIVER
12 CONTROLLER
13 TRANSMITTER
20 GATEWAY
30 CORE NETWORK
50 RNC
60 MACRO BASE STATION
70 MONITORING DEVICE
72 CLASSIFIER
73 NOTIFIER
100 MOBILE STATION
CH1 RADIO CHANNEL FOR TRANSMITTING BROADCAST INFORMATION
CH2 RADIO CHANNEL FOR BROADCAST COMMUNICATION
INFO1 BROADCAST INFORMATION
INFO2 SPECIFYING INFORMATION
INFO3, INFO3_10a-INFO3_10c LOCATION INFORMATION
TA ADJUSTED TRANSMISSION TIMING
Tt10, Tt40 TRANSMISSION TIMING
Ts SHIFT TIME
DT DATA
CL10, CL10a-CL10c, CL60 CELL
RSLT CLASSIFICATION RESULT
LST, LST_10a-LST_10c ADJACENT CELL LIST

The invention claimed is:

1. A radio base station comprising:
a receiver that receives broadcast information transmitted from a different radio base station through a first radio channel;
a controller that specifies a second radio channel used for broadcast communication by said different radio base station and adjusts a timing of transmission through the second radio channel in its own radio base station to be synchronized with a timing of transmission in said different radio base station, based on the broadcast information; and
a transmitter that transmits data through the second radio channel in accordance with the adjusted timing of transmission,
wherein the controller notifies an external monitoring device of location information of its own radio base station to make the monitoring device determine whether or not its own radio base station is the one to perform the adjustment.

2. The radio base station according to claim 1, wherein the controller performs the notification of the location information to the monitoring device at least upon activation of its own radio base station.

3. The radio base station according to claim 2, wherein the controller performs the notification of the location information to the monitoring device at certain time intervals after the activation of its own radio base station.

4. The radio base station according to claim 1, wherein the first and second radio channel comprise a PCCPCH (Primary Common Control Physical Channel) and an SCCPCH (Secondary Common Control Physical Channel) respectively prescribed in a WCDMA (Wideband Code Division Multiple Access) method,
the broadcast information includes a delay time of a timing of transmission through the SCCPCH with respect to a timing of transmission through the PCCPCH in said different radio base station, and
the controller detects a shift time in timings of transmission through the PCCPCH between said different radio base station and its own radio base station, and determines a timing of transmission through the SCCPCH in its own radio base station by using the shift time and the delay time.

5. The radio base station according to claim 1, wherein the first and second radio channel comprise a PCCPCH and an SCCPCH respectively prescribed in a WCDMA method,
the broadcast information includes a delay time of a timing of transmission through the SCCPCH with respect to a timing of transmission through the PCCPCH in said different radio base station,
the receiver receives data from said different radio base station through the SCCPCH based on the delay time, and
the controller synchronizes a timing of transmission through the SCCPCH in its own radio base station with a reception timing of the data.

6. The radio base station according to claim 5, wherein the controller makes the transmitter transmit through the SCCPCH the data received from said different radio base station without any modification.

7. A radio base station comprising:
a receiver that receives broadcast information transmitted from a different radio base station through a first radio channel;
a controller that specifies a second radio channel used for broadcast communication by said different radio base station and adjusts a timing of transmission through the second radio channel in its own radio base station to be synchronized with a timing of transmission in said different radio base station, based on the broadcast information; and
a transmitter that transmits data through the second radio channel in accordance with the adjusted timing of transmission,
wherein the first and second radio channel comprise a PBCH (Physical Broadcast Channel) and a PMCH (Physical Multicast Channel) respectively prescribed in an OFDMA (Orthogonal Frequency Division Multiple Access) method,
the broadcast information includes allocation information of a radio resource concerning the PMCH in said different radio base station, and
the controller allocates a radio resource concerning the PMCH in its own radio base station in accordance with the allocation information.

8. A monitoring device comprising:
a receiver that receives, respectively from a plurality of radio base stations, specifying information to specify a reachable range of a radio signal from each radio base station;
a classifier that classifies the radio base stations as a master radio base station to determine a timing of transmission through a radio channel for broadcast communication and a slave radio base station to synchronize a timing of transmission through the radio channel with the timing of transmission in the master radio base station, based on the specifying information; and
a notifier that notifies a result of the classification to each radio base station.

9. The monitoring device according to claim 8, wherein each specifying information comprises identifying information of a cell adjacent to a cell formed by each radio base station in association with identifying information of the cell formed by each radio base station.

10. The monitoring device according to claim 8, wherein each specifying information comprises location information of each radio base station.

11. A radio access network comprising:
a plurality of radio base stations; and
a monitoring device capable of communicating with the radio base stations,
wherein the monitoring device classifies the radio base stations as a master radio base station to determine a timing of transmission through a radio channel for broadcast communication and a slave radio base station to synchronize a timing of transmission through the radio channel with the timing of transmission in the master radio base station based on specifying information received from each radio base station to specify a reachable range of a radio signal from each radio base station, and notifies a result of the classification to each radio base station, and
the slave radio base station specifies the radio channel for the broadcast communication based on broadcast information received from the master radio base station through a radio channel different from the radio channel for the broadcast communication, adjusts a timing of transmission through the radio channel for the broadcast communication to be synchronized with the timing of transmission in the master radio base station, and transmits data through the radio channel for the broadcast communication in accordance with the adjusted timing of transmission.

12. A communication controlling circuit that makes a radio base station perform broadcast communication, comprising:
a receiver that receives broadcast information transmitted from a different radio base station through a first radio channel;
a controller that specifies a second radio channel used for the broadcast communication by said different radio base station and adjusts a timing of transmission through the second radio channel in said radio base station to be synchronized with a timing of transmission in said different radio base station, based on the broadcast information; and
a transmitter that transmits data through the second radio channel in accordance with the adjusted timing of transmission,
wherein the controller notifies an external monitoring device of location information of said radio base station to make the monitoring device determine whether or not said radio base station is the one to perform the adjustment.

13. A non-transitory computer readable medium that stores a communication controlling program for causing a radio base station to execute:
a process to receive broadcast information transmitted from a different radio base station through a first radio channel;
a process to specify a second radio channel used for broadcast communication by said different radio base station and to adjust a timing of transmission through the second radio channel in said radio base station to be synchronized with a timing of transmission in said different radio base station, based on the broadcast information;
a process to transmit data through the second radio channel in accordance with the adjusted timing of transmission; and
a process to notify an external monitoring device of location information of said radio base station to make the monitoring device determine whether or not said radio base station is the one to perform the adjustment.

14. A method of controlling communication in a radio base station, comprising:
receiving broadcast information transmitted from a different radio base station through a first radio channel;
specifying a second radio channel used for broadcast communication by said different radio base station and adjusting a timing of transmission through the second radio channel in said radio base station to be synchronized with a timing of transmission in said different radio base station, based on the broadcast information;
transmitting data through the second radio channel in accordance with the adjusted timing of transmission; and
notifying an external monitoring device of location information of said radio base station to make the monitoring device determine whether or not said radio base station is the one to perform the adjustment.

15. A method of monitoring a radio base station, comprising:
receiving, respectively from a plurality of radio base stations, specifying information to specify a reachable range of a radio signal from each radio base station;
classifying the radio base stations as a master radio base station to determine a timing of transmission through a radio channel for broadcast communication and a slave radio base station to synchronize a timing of transmission through the radio channel with the timing of transmission in the master radio base station, based on the specifying information; and
notifying a result of the classification to each radio base station.

* * * * *